US011610136B2

(12) United States Patent
Jasionowski et al.

(10) Patent No.: US 11,610,136 B2
(45) Date of Patent: Mar. 21, 2023

(54) PREDICTING THE DISASTER RECOVERY INVOCATION RESPONSE TIME

(71) Applicant: Kyndryl, Inc., New York, NY (US)

(72) Inventors: Pawel Jasionowski, Wroclaw (PL); George E. Stark, Lakeway, TX (US); Daniel S. Riley, Wake Forest, NC (US); Michael H. Roehl, New Fairfield, CT (US)

(73) Assignee: Kyndryl, Inc., New York, NY (US)

( * ) Notice: Subject to any disclaimer, the term of this patent is extended or adjusted under 35 U.S.C. 154(b) by 379 days.

(21) Appl. No.: 16/417,600

(22) Filed: May 20, 2019

(65) Prior Publication Data

US 2020/0372372 A1 Nov. 26, 2020

(51) Int. Cl.
*G06N 5/02* (2023.01)
*G06N 7/01* (2023.01)

(52) U.S. Cl.
CPC ............... *G06N 5/02* (2013.01); *G06N 7/01* (2023.01)

(58) Field of Classification Search
CPC .......... G06N 5/02; G06N 7/005; G06N 20/00; G06N 5/04; G06F 16/2465
See application file for complete search history.

(56) References Cited

U.S. PATENT DOCUMENTS

| 6,155,292 A | 12/2000 | Kurata |
| 6,496,941 B1 | 12/2002 | Segal et al. |
| 6,981,177 B2 | 12/2005 | Beattie |
| 9,317,566 B1 * | 4/2016 | L'Huillier .......... G06Q 30/0281 |
| 9,734,456 B1 * | 8/2017 | Marino .................. H04W 4/021 |
| 2003/0149558 A1 * | 8/2003 | Holsapfel ............... G10L 13/10 704/4 |
| 2004/0078397 A1 | 4/2004 | Mehta et al. |
| 2004/0128186 A1 | 7/2004 | Breslin et al. |
| 2004/0236676 A1 | 11/2004 | Takezawa et al. |

(Continued)

FOREIGN PATENT DOCUMENTS

| IN | 4421MUM2015 A | 5/2017 |
| JP | 2016218940 A | * 12/2016 |

OTHER PUBLICATIONS

Hall et al., "Integrated Flood Risk Management in England and Wales," Natural Hazards Review, Aug. 2003, p. 1-10, vol. 4, Issue 3, ASCE.

(Continued)

*Primary Examiner* — Michael J Huntley
*Assistant Examiner* — Sehwan Kim
(74) *Attorney, Agent, or Firm* — Dan Housley, Esq.; Kevin P. Radigan, Esq.; Heslin Rothenberg Farley & Mesiti P.C.

(57) ABSTRACT

A method, computer system, and a computer program product for estimating the probability of invoking information technology (IT) disaster recovery at a location based on an incident risk is provided. The present invention may include receiving a piece of data associated with an incident at the location. The present invention may also include estimating a similarity value associated with the incident based on a plurality of past incidents from a knowledge base. The present invention may then include receiving a plurality of mined data based on the location. The present invention may further include predicting the incident risk to the location based on the received plurality of mined data and the estimated similarity value to the plurality of past incidents.

18 Claims, 5 Drawing Sheets

(56) References Cited

U.S. PATENT DOCUMENTS

| | | | |
|---|---|---|---|
| 2005/0027571 A1* | 2/2005 | Gamarnik | G06Q 40/08 705/4 |
| 2009/0172460 A1 | 7/2009 | Bobak et al. | |
| 2009/0276257 A1 | 11/2009 | Draper et al. | |
| 2009/0300409 A1 | 12/2009 | Bates et al. | |
| 2011/0173405 A1 | 7/2011 | Grabarnik et al. | |
| 2011/0213628 A1 | 9/2011 | Peak et al. | |
| 2013/0054536 A1* | 2/2013 | Sengupta | G06F 16/21 707/654 |
| 2013/0091139 A1* | 4/2013 | Rajpathak | G06F 40/30 707/740 |
| 2015/0142506 A1* | 5/2015 | Kumar | G06Q 10/0635 705/7.28 |
| 2015/0281933 A1 | 10/2015 | Hasesaka | |
| 2016/0104126 A1* | 4/2016 | Eleid | G06Q 10/20 705/305 |
| 2017/0178038 A1* | 6/2017 | Guven | G06Q 30/016 |
| 2017/0308421 A1* | 10/2017 | Angeles | G06F 11/0709 |
| 2017/0315987 A1* | 11/2017 | Srinivasan | G06F 40/40 |
| 2018/0074887 A1 | 3/2018 | Braham et al. | |
| 2018/0130134 A1* | 5/2018 | Byles Williams | G06Q 40/06 |
| 2018/0189913 A1* | 7/2018 | Knopp | G06Q 40/08 |
| 2019/0012381 A1* | 1/2019 | Debique | G06F 16/3329 |
| 2019/0108465 A1* | 4/2019 | Zhou | G06Q 10/06375 |
| 2020/0117529 A1* | 4/2020 | Qiao | G06F 16/9024 |
| 2020/0159609 A1* | 5/2020 | Korotaev | G06F 11/079 |
| 2020/0278901 A1* | 9/2020 | Singh | G06F 11/004 |
| 2020/0320167 A1* | 10/2020 | Mane | G06F 16/3344 |

OTHER PUBLICATIONS

Mell et al., "The NIST Definition of Cloud Computing," National Institute of Standards and Technology, Sep. 2011, p. 1-3, Special Publication 800-145.

* cited by examiner

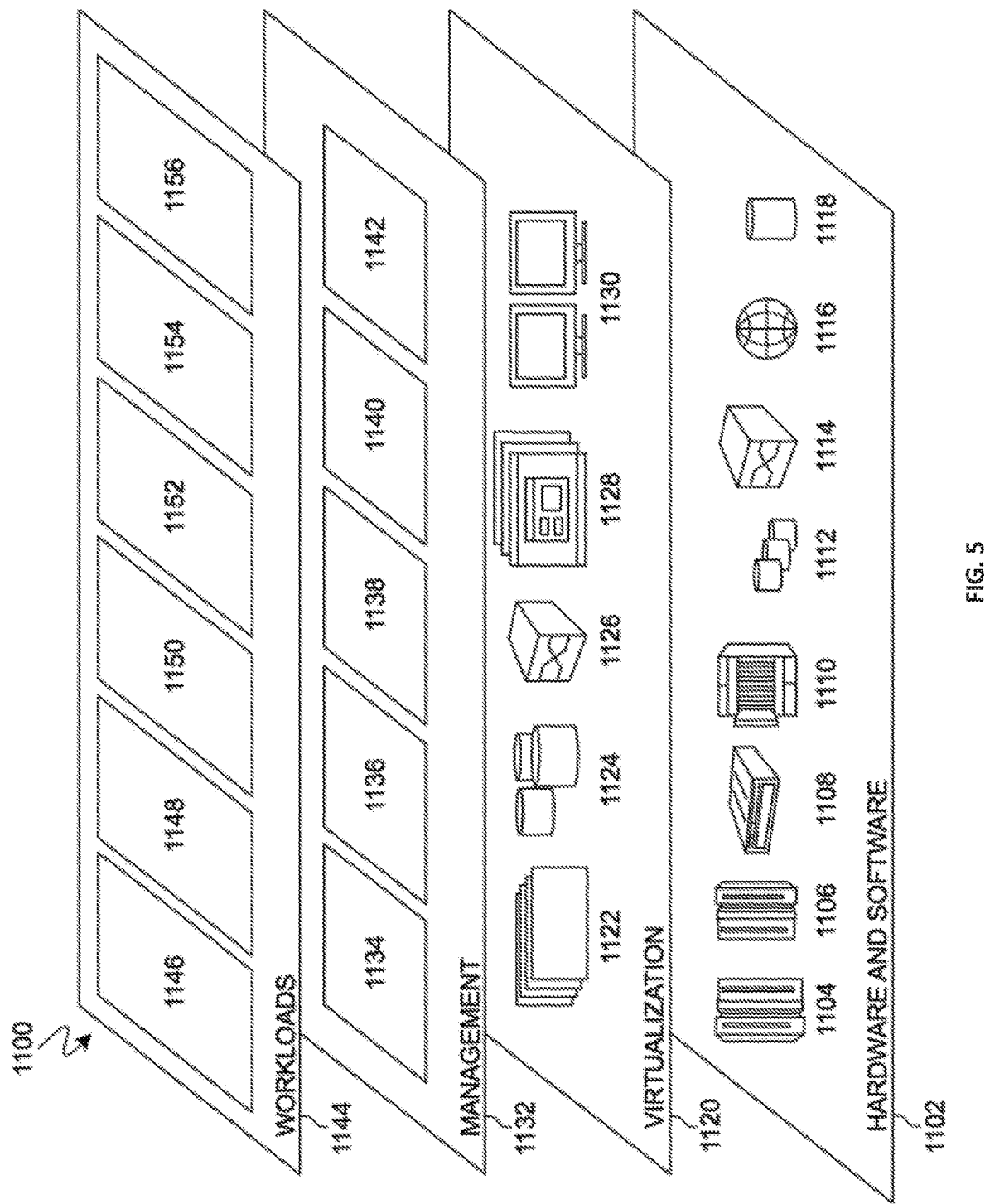

PREDICTING THE DISASTER RECOVERY INVOCATION RESPONSE TIME

BACKGROUND

The present invention relates generally to the field of computing, and more particularly to information technology (IT) service continuity management (ITSCM).

ITSCM (information technology service continuity management) may assist customers with preparing in case a disaster strikes critical Information Technology (IT) services utilized to conduct core business functions and systems. By implementing the best IT service continuity management practices and standards, ITSCM may be kept up-to-date and may periodically test the ITSCM plans describing the actions to be taken to recover the vital business functions and systems. The two key deliverables may include: (1) advising customers via data analyses; and (2) managing the risks connected with new incidents.

SUMMARY

Embodiments of the present invention disclose a method, computer system, and a computer program product for estimating the probability of invoking information technology (IT) disaster recovery at a location based on an incident risk. The present invention may include receiving a piece of data associated with an incident at the location. The present invention may also include estimating a similarity value associated with the incident based on a plurality of past incidents from a knowledge base. The present invention may then include receiving a plurality of mined data based on the location (e.g., architecture, network and device configurations, workloads, weather, social media posts). The present invention may further include predicting the incident risk to the location based on the received plurality of mined data and the estimated similarity value to the plurality of past incidents.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5 is a block diagram of functional layers of the illustrative cloud computing environment of FIG. 4, in accordance with an embodiment of the present disclosure.

DETAILED DESCRIPTION

Figure 1:
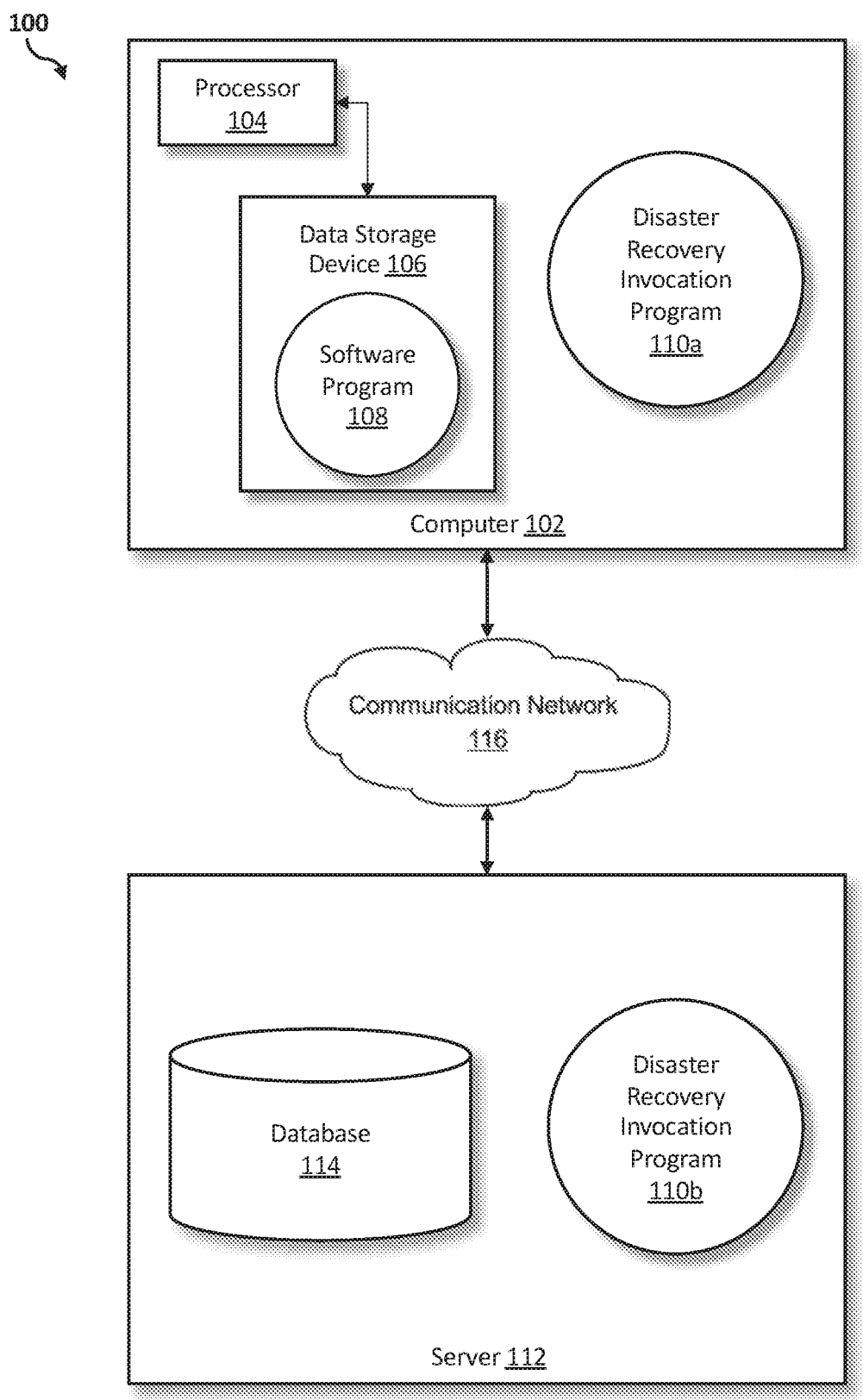
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for estimating one or more incident risks that trigger a disaster recovery invocation. As such, the present embodiment has the capacity to improve the technical field of information technology (IT) service continuity management by assessing the likelihood of a disaster recovery invocation for the appropriate team to be notified, with a reduced response time, to begin to shift workloads from a primarily processing center to a data recovery center. More specifically, the disaster recovery invocation program may identify the incident based on the data received, and then analyze the data properties included in the incident. The disaster recovery invocation program may then estimate the description similarities based on historical classification of other data from a tickets database. Then, the disaster recovery invocation program may commence a classification component, then a weather prediction and social media analytics component, and then a predicting risk component in which the disaster recovery invocation program may assess the risk of disaster recovery invocation.

As previously described, ITSCM (Information Technology Service Continuity Management) may assist customers with preparing in case a disaster strikes critical Information Technology (IT) services utilized to conduct core business functions and systems. By implementing the best IT service continuity practices and standards, ITSCM may be kept up-to-date and may periodically test the ITSCM plans describing the actions to be taken to recover the vital business functions and systems. The two key deliverables may include: (1) advising customers via data analyses; and (2) managing the risks connected with new incidents. The purpose of incident analysis may be to understand the risk connected with the incident in terms of possible disaster recovery invocation to be implemented, or other possible scenarios (e.g., major incident declaration).

Additionally, the risk may be directly connected with locations. The location may be well equipped with systems and methods to prevent disaster (e.g., Server Recovery Manager), which may automatically recover data in another location that is not at risk. A Server Recovery, for example, may in fact cause the risk as the typical recovery center is less powerful in terms of computational power than the original center. Typically, a recovery center may have 20% of the computational power compared to the original data center and may handle only critical business. Nevertheless, the disaster recovery invocation program may not consider the risk of disaster itself. Instead, the disaster recovery invocation program may estimate the risk connected with disaster recovery invocation that may be implemented, which may, or may not, lead to real site recovery.

Currently, the disaster recovery invocation may take a significant amount of time and may be reactionary to such events. Therefore, it may be advantageous to, among other things, estimate the probability of disaster recovery invocation that may be implemented by corroborating historical classification of infrastructure incidents, high severity incidents/data center infrastructure failure, security incidents and physical breach of a data center, data center infrastructure protection level, business risk connected with importance of IT environment, social media data, acts of war or terrorism, pandemic situations, and weather and natural disaster data. The disaster recovery invocation program may also stop (or abort) the disaster recovery invocation preparation or execution based on a proposed classification, and reduce a probability of missing the IT environment recovery Service Level Agreement by improving recovery time through the utilization of a simulation engine to proactively assess the invocation to be implemented based on confidence level. The disaster recovery invocation program may further include a continual learning improvement component, which stores the results of the calculation, and may utilize the results of the calculation to modify the incident knowledge base, when specific business impact occurs.

Additionally, the business effect of predicting high risk may include a raised awareness of upcoming incidents that may cause disaster recovery invocation in IT Service Continuity and Resiliency teams, the notification of important contacts (e.g., internal account management and external client representatives responsible for disaster recovery) and start internal preparation (e.g., mobilize and activate technical teams necessary to facilitate the resumption of time-sensitive business operations). The disaster recovery invocation program may continually assess and report Incident impact in accordance with the Service Provider Disaster Recovery Plan (i.e., extent of damage and disruption to the Services and business operations), as well as may prepare to invoke and execute additional activities set out within the relevant Service Provider Disaster Recovery Plan, report status of the activities being undertaken, and provide links to appropriate procedures and planning documents necessary to effectively execute the recovery.

According to at least one embodiment, the disaster recovery invocation program may estimate the risk of incidents (i.e., incident risks) that may trigger disaster recovery invocation. The invocation of the disaster recovery may be initiated when (a) a data processing site is unreachable, (b) a particular data processing service is unavailable, and (c) key personnel are unavailable, making the capabilities of the normal data processing difficult. The present embodiment may include predicting the likelihood of any of these situations and may notify the appropriate team to commence the activities to shift workloads from a primary processing center to a data recovery center. The notification may save a considerable amount of time (e.g., several hours) of processing time and may avoid a considerable amount of money in business losses (e.g., millions of dollars) for little cost and effort.

According to at least one embodiment, in addition to the risk notification, the disaster recovery invocation program may provide links to appropriate procedures and planning documents utilized to effectively execute the recovery. The present embodiment may include a mechanism designed to assess the likelihood of the need for disaster recovery invocation, which utilizes natural language processing (NLP) along with machine learning (ML) techniques to increase the accuracy of the risk assessment.

According to at least one embodiment, there may be several input data sources utilized by the disaster recovery invocation program to calculate the risk associated with the loss of the critical processing for certain situations (e.g., high severity incidents, data center infrastructure failure, security incidents and physical breach of a data center, data center infrastructure protection level, business risk connected with importance of IT environment, social media data, acts of war or terrorism, pandemic situations, or weather and natural disaster data). To assess the need to invoke a disaster recovery option, the present embodiment may include the utilization of the data sources along with historical classification of incidents which may be treated as a knowledge base. Based on redundancy and pattern analysis, the disaster recovery invocation program may compare a new data center, security incident and situation data to a knowledge base and may assess the likelihood of necessity to invoke disaster recovery procedures. The cognitive solutions (e.g., natural language classification and continual learning) may be included as a part of the disaster recovery invocation program.

According to at least one embodiment, the disaster recovery invocation program may focus on disasters that lead to the site being unreachable, service unavailability or personnel unavailability, and the disaster recovery invocation program may be influenced by non-IT factors (e.g., external factors). Therefore, the disaster recovery invocation program may include, as a part of a risk assessment, additional data from weather monitoring (e.g., focusing on territorial connections between location and weather predictions), social media by searching for disaster mentions or acts of terrorism, pandemic notification, or data center breach.

According to at least one embodiment, the disaster recovery invocation program may design a simulation engine. The disaster recovery invocation program may include three parallel levels of confidence used for situation classification; where alerts may be transmitted from additional data inputs, where data protection level and business risk connected with the level of inclusion for the IT environment are defined, and where incidents are logged in a ticketing system. Using a predictive analytics engine, the disaster recovery invocation program may determine the next steps by identifying a plurality of relevant information from the received data associated with the three parallel levels of confidence.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a disaster recovery invocation program 110a. The networked computer environment 100 may also include a server 112 that is enabled to run a disaster recovery invocation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the disaster recovery invocation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the disaster recovery invocation program 110a, 110b (respectively) to estimate the risk of incidents that trigger disaster recovery invocation. The disaster recovery invocation method is explained in more detail below with respect to FIG. 2.

Figure 2:
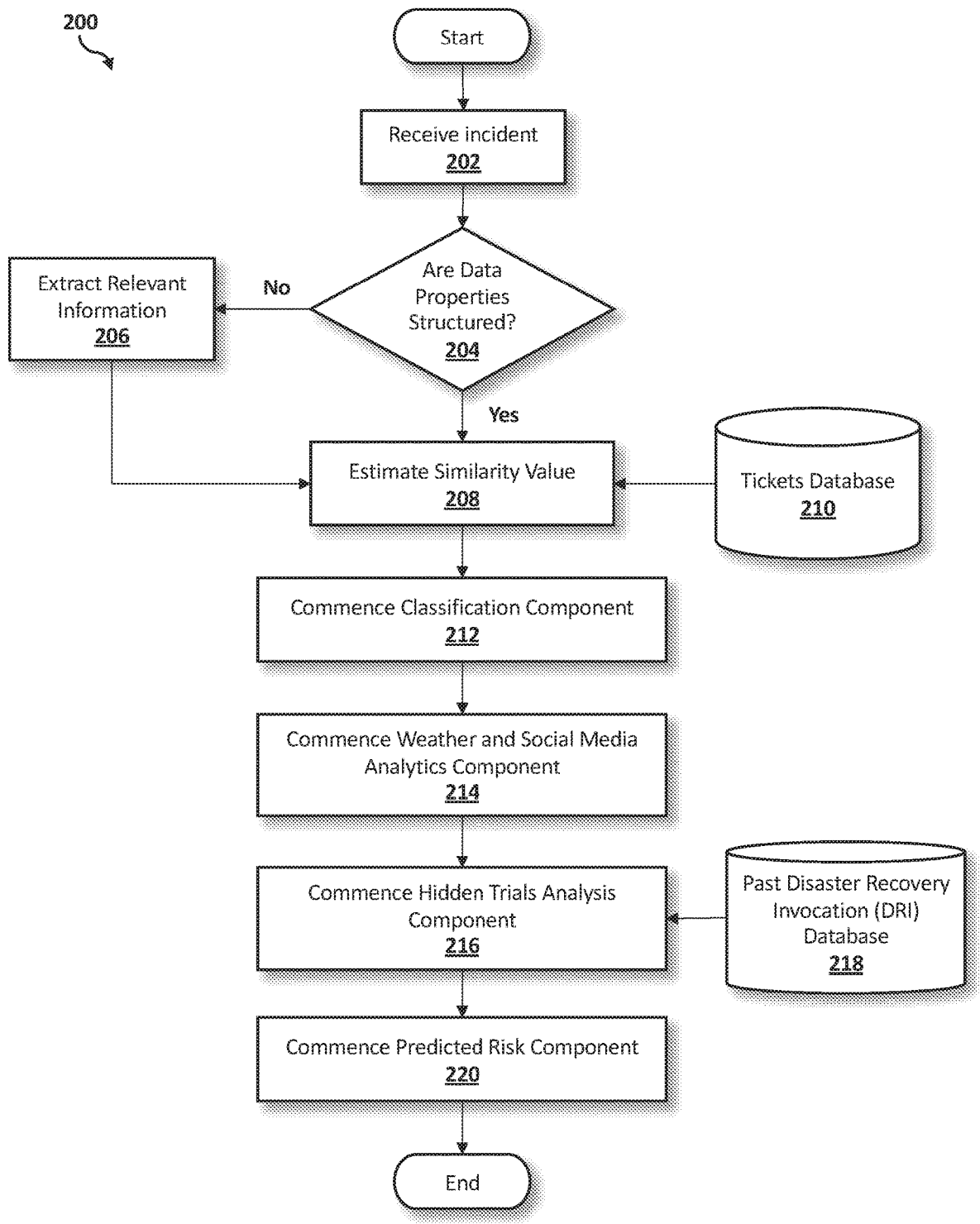
FIG. 2 is an operational flowchart illustrating a process for disaster recovery invocation according to at least one embodiment.

Referring now to FIG. 2, an operational flowchart illustrating the exemplary disaster recovery invocation process 200 used by the disaster recovery invocation program 110a, 110b according to at least one embodiment is depicted.

At 202, an incident is received. Utilizing a software program 108 on the user's device (e.g., client computer 102), data associated with an incident (x) may be transmitted as input into the disaster recovery invocation program 110a, 110b, via the communication network 116. The incident may include an incident ticket, an infrastructure ticket, an infrastructure failure, a security incident, a weather alert, a social media warning, or any other form of notification associated with the incident. The disaster recovery invocation program 110a, 110b may utilize a predictive engine to identify relevant information and/or data associated with the incident (e.g., a date of reporting incident date), at least one reporting data center, an incident summary (e.g., topic of the incident), a description of the incident (i.e., incident description), and other optionally relevant information.

For example, IT representative ABC is notified that the disaster recovery invocation program 110a, 110b received an incident notification, Incident Ticket #XYZ2017, that Server XYZ has malfunctioned in Data Center X located approximately 3,000 miles away from the headquarters. The incident notification stated the following:
Incident Date: Apr. 10, 2019 at 4:45 am.
Incident Description & Summary: Server XYZ has abruptly stopped operating.
Reporting Data Center Location: Data Center X located in Miami, Fla.

Then, at 204, the disaster recovery invocation program 110a, 110b determines whether the data properties are structured. The disaster recovery invocation program 110a, 110b may utilize one or more external engine or technologies to determine whether the data properties associated with the received incident are structured. Structured data may refer to any data that resides in a fixed field within a record or file (e.g., photos and graphic images, videos, streaming instrument data, webpages, Portable Document Format (PDF) files, PowerPoint presentations, emails, blog entries and word processing documents), and may include defined data types whose pattern causes the data to be easily searchable. Structured data, for example, includes a start date, a call code, a host name, a region name, and a site name. Structured data may be stored in dedicated fields in a defined data format in the incident record. The defined data format may include, for example, a series of date formats (e.g., dd-mm-rrrr, mm-dd-rrrr, rrrr-mm-dd), and a call code (e.g., define a list of possible call codes in the incident). The disaster recovery invocation program 110a, 110b may utilize a search engine to parse through the data associated with the incident to determine whether the data properties include a defined data format, which is indicative of structured data.

Unstructured data, however, may include data that is not easily searchable (e.g., text written by human as a comment). For example, unstructured data includes streaming data coming from social media platforms, e-mail messages, word processing documents, comments inserted by a human as text, and business interactions, such as questions and responses exchanged by different technical divisions. In some embodiments, files with an internal structure may be considered unstructured, since the data within the files may fail to clearly fit within one or more fixed fields in a rational database (e.g., database 114).

If the disaster recovery invocation program 110a, 110b determines that the data properties are not structured (i.e., unstructured) at 204, then the relevant information is extracted at 206. The disaster recovery invocation program 110a, 110b may utilize one or more external technologies (e.g., UIMA (Unstructured Information Management Architecture) standard) to parse through the unstructured data properties associated with the received incident, and to extract the incident summary and description of the incident, which may be provided in plain text (i.e., text provided by human operator as description of the technical event which happened in the infrastructure and the tasks executed to resolve the situation).

In at least one embodiment, the disaster recovery invocation program 110a, 110b may, in the case of automated resolution, provide plain text as structured data with time stamps. In some embodiments, human technicians may be utilized to convert unstructured data into structured data.

In another embodiment, the ticketing systems used to log and store incident tickets may include some dedicated fields (e.g., Title, Summary, Description, Technical Description, Resolution). These fields may be analyzed and utilized to determine what type of data are included based on the pre-defined field descriptions. The field naming, however, may differ for different tools. The disaster recovery invocation program 110a, 110b may define a list of most typical field names to match the field names with the content. The incident summary and description may usually be provided as text inserted by the human operator into the ticketing system. The technical description may have some structured form (e.g., a template) used by technical teams to be filled each time an incident is reported. The template may include a field for a description of the situation.

In at least one embodiment, the disaster recovery invocation program 110a, 110b may include semi-structured data, which may include a cross between the structured data and unstructured data. The semi-structured data may include a type of structured data that lacks the strict data model structure. With semi-structured data, tags or other types of markers may be used to identify certain elements within the data, without the rigid structure. For example, a word processing software can include metadata showing the author's name and the date created, with the bulk of the document being considered unstructured text. In another example, emails include a sender, a recipient, a date, a time and other fixed fields, added to the unstructured data of the email message content and any attachments.

In at least one embodiment, the disaster recovery invocation program 110a, 110b may utilize technologies or an external engine to process and store the unstructured data.

Continuing the previous example, if the disaster recovery invocation program 110a, 110b determined that the data properties associated with Incident Ticket #XYZ2017 were not structured, then the relevant information, namely incident summary and description, would be extracted from the data associated with the incident.

Regardless of whether the disaster recovery invocation program 110a, 110b determines that the data properties are structured at 204, or the incident-related data is extracted at 206, the similarity value is estimated at 208. For structured data properties, the disaster recovery invocation program 110a, 110b may parse through the data associated with the received incident to identify and extract the incident date, as well as optionally relevant information (e.g., call code, hostname, region name, site name). The relation between incident summary, description and site name, hostname and other optionally relevant information may be utilized to assess the risk and make a decision about whether disaster recovery should be invoked.

In at least one embodiment, the disaster recovery invocation program 110a, 110b may not receive the optionally relevant information. Therefore, the disaster recovery invocation program 110a, 110b may utilize the data included in the description and resolution text fields to calculate the optionally relevant information. For example, in 2017, Hurricane Maria struck a data processing center location in the US. The center was flooded, but due to some additional factors, like site protection mechanisms, the disaster recovery was not invoked. Based on the incident summary and description that referred to a malfunctioned server and information indicating that the data center was located in the path of Hurricane Maria, the existing ITSCM plan was still unable to make a final decision. If the disaster recovery invocation program 110a, 110b had been implemented, the optionally relevant information, such as the site name, would have been utilized to determine (based on created knowledge base about data center location) if this data center location had an appropriate level of protection mechanisms (e.g., natural disaster risk-free locations, detection sensors, strengthened construction). The region name may also have been utilized to compare with other similar incidents in the same region, or within a certain proximity of the region.

In another example, hurricanes, in addition to similar natural disasters, such as floods, may influence the nearby area where a power station that provides the electricity to one or more data centers is located. Based on site location and region name, the disaster recovery invocation program 110a, 110b can form a link between the influenced region and data center location. Based on site name, the disaster recovery invocation program 110a, 110b may determine (based on created knowledge base about data center) that the data center is equipped with a diesel electric generator. Therefore, the disaster recovery invocation program 110a, 110b can assess the risk of electricity loss more accurately, and stop disaster recovery invocation since invoking disaster recovery is not necessary at that time.

Additionally, for structured and unstructured data properties, the disaster recovery invocation program 110a, 110b may utilize a text cleaning function (e.g., Cln(text)). By utilizing the text cleaning function, the disaster recovery invocation program 110a, 110b may split the plain text (e.g., ticket description joined with ticket resolution) by spaces, remove any stop words (e.g., some common short function stop words include "is", "at", "the", "which"), remove any host names based on the configuration management database (CMDB) information, remove any words with three or more consecutive vowels, remove any numbers, and other cleaning text steps.

For both structured and unstructured data properties, the disaster recovery invocation program 110a, 110b may retrieve past historical data associated with past incidents (i.e., existing incidents) from a tickets database 210 (e.g., database 114). The tickets database 210 may include a knowledge base of incident tickets that were identified in history (or past data) as incidents which caused or might cause disaster recovery invocation. The received incident (x) may then be compared with each existing incident (y) from the tickets database 210 (KB) by utilizing the Cnt(x,y) function. Then, the disaster recovery invocation program 110a, 110b may define:

$$Swc(x,y)=(Cnt(Cln(x),Cln(y)))/Cln(x),$$

where Swc(x,y) defines the similarity between the considered incident (x) and the past incidents from the knowledge base, and where Cnt(Cln(x)) indicates a counter for the text cleaning function.

Then $$SwcM(x)=\text{Max}(Swc(x,y)) \text{ for } y \text{ in } KB,$$

where the Max (Swc(x,y)) defines the maximum similarity between the considered incident and the past incidents from the knowledge base.

The disaster recovery invocation program 110a, 110b may then utilize a classifier to perform an analysis of the plain text included in the received incident (x) to estimate the description similarities with other past historical data associated with past incidents (y) retrieved from the tickets database 210.

In at least one embodiment, the classifier may perform a contextual analysis of the plain text based on natural language processing (NLP) techniques (e.g., text embeddings) (i.e., NL classifier) to analyze the text included in the received incident, as well as consecutively or simultaneously search the existing incidents from the tickets database 210 to identify similarities in the context or text. The NL classifier may then compare the identified context from the received incident with the identified context from the existing incidents in the tickets database 210.

In at least one embodiment, the classifier may perform a keyword analysis (i.e., keyword analyzer) on the incident-related data or structured data properties associated with the received incident. The keyword analysis may include individual words, or phrases (e.g., including more than one word in a consecutive sequence). The keyword analyzer may consecutively or simultaneously search the tickets database 210 to identify keywords in each of the existing incidents. The keyword analyzer may then compare the identified keywords from the received incident with the identified keywords from the existing incidents in the tickets database 210.

Additionally, the disaster recovery invocation program 110a, 110b may apply weight (wgt_w) for each term (e.g., keyword, phrase), differing the weight for each term, to identify the significance of the term in connection with the risk assessment by analyzing whether the term is included in the defined terms (K) in the tickets database 210. The disaster recovery invocation program 110a, 110b may then define weight(w) for each term as follows:

weight(w)=wgt_w if w in K weight(w)=0 otherwise

Then

Kwa(x)=Max(weight(w)) for w in x

In at least one embodiment, the classifier may generate a score as a percentage (e.g., normalized quantity ranging from 0-100%) associated with the similarity of the received incident to each existing incident in the tickets database 210 (i.e., a similarity value). The higher the percentage, the greater the similarity between the received incident and the existing incident. In some embodiments, the classifier may generate a score as a numeric value (e.g., normalized quantity ranging from 0-1, 0-10, 0-100) associated with the similarity of the received incident to each existing incident in the tickets database 210 (i.e., similarity value). The higher the score or similarity value, the greater the similarity between the received incident and the existing incident.

In an embodiment, the score may be based on the defined weight for each term as determined by the disaster recovery invocation program 110a, 110b.

Additionally, the classifier may sort and rank the similarity value (i.e., weight and/or score) for each existing incident. The classifier may then generate a list with the similarity value associated with the received incident and each existing incident. In at least one embodiment, the generated score may be compared with a previously determined threshold level (e.g., a default level is 75% out of 100%, 0.75 out of 1, 7.5 out of 10, 75 out of 100). If the generated score fails to satisfy the previously determined threshold level, then the classifier may classify the received incident as dissimilar (i.e., not similar) from the existing incident, and may exclude the corresponding existing incident from the list. If the generated score satisfies the previously determined threshold level, then the classifier may classify the received incident as similar to the existing incident, and may include the corresponding existing incident in the list.

In at least one embodiment, the default threshold level may be re-configured by an administrator on a case-by-case basis, or based on a pattern over a period of time. For example, if a user determines that the received incidents and existing incidents have a high level (or degree) of similarity that may exceed 75% for a majority of the existing incidents, then the user may prefer to increase the threshold level to decrease the number of similar existing incidents included in the list.

In some embodiments, the classifier may be re-configured to select a certain number (e.g., top 10, top 20) of similar existing incidents to include in the list based on the ranking of the existing incidents.

The classifier may then transmit the generated list, via the communications network 116, to the disaster recovery invocation program 110a, 110b.

Continuing the previous example, the text associated with the Incident Ticket #XYZ2017 is cleaned to remove spaces, numbers (not associated with the relevant information), and stop words. Then, the disaster recovery invocation program 110a, 110b generates the following text for Incident Ticket #XYZ2017:
Apr. 10, 2019 4:45 am
Server XYZ abruptly stopped operating
Data Center X Miami Fla.

Then, the text associated with Incident Ticket #XYZ2017 is compared to more than 200 past incidents from the tickets database 210. The disaster recovery invocation program 110a, 110b then utilizes a keyword analyzer to identify keywords. The keyword analyzer then identifies keywords "Server XYZ", "abruptly stopped operating", "Miami" and "Florida", which 5 past incidents also have included their description. The classifier then estimates a similarity value to each of the 5 past incidents with the identified keywords. The classifier then ranks and sorts the similarity values with the corresponding past incidents, and generates the following list that is transmitted to the disaster recovery invocation program 110a, 110b:
Incident Ticket #ABC1997—95%
Incident Ticket #DEF1998—92%
Incident Ticket #GHI1999—91%
Incident Ticket #JKL1999—90%
Incident Ticket #MN02016—85%

Then, at 212, the classification component is commenced. Utilizing the classification component, the disaster recovery invocation program 110a, 110b may classify the received incident into a category (e.g., one of n classes) based on the similarities between the received incident and the existing incidents in the tickets database 210. The disaster recovery invocation program 110a, 110b may then analyze the existing incidents included in the generated list. Based on the classes or categories of the existing incidents, the disaster recovery invocation program 110a, 110b may determine the classification of the received incident. For example, if a majority of the similar existing incidents are classified as X, then Received Incident A is classified X.

In at least one embodiment, the disaster recovery invocation program 110a, 110b may utilize the data center infrastructure protection level and the business risk connected with the importance of the IT to determine the appropriate class or category to classify the received incident. Business risk for the appropriate data center (i.e., site) may be evaluated based on the importance of the IT infrastructure hosted. For example, Data Center W in Warwick, United Kingdom, where multi-client infrastructure is hosted, is working at nearly 100% capacity and even small defect can largely impact the final customer. As such, the business risk for such a data center is very high. However, Data Center B, which is a backup data center dedicated to one customer, is not an integral part of the business since Data Center B is operated in a standard way and end user utilization is small. Data Center B is a safe place to keep backup data in case something happens to the original data center, Data Center W. Therefore, the business risk for Data Center B is low because Data Center B can be recovered, even if disaster strikes the site, without direct impact to the final customer.

In another example, there is Server A which is responsible for transaction processing for a big customer such as a bank, and Server C, which is a test environment used for internal purposes to test current development. As such, the business risk for the Server A would be high, and for Server C would be low.

Continuing the previous example, since each of the past incidents included on the generated list are a part of class 7, then the disaster recovery invocation program 110a, 110b classified Incident Ticket #XYZ2017 as a part of class 7, which is high risk because the Server XYZ stores a majority of the confidential memorandums circulated within a 10 year time period by the company.

Then, at 214, the weather and social media analytics component is commenced. The weather and social media analytics component, which is divided into two sub-components: weather analytics sub-component and social media analytics sub-component, may analyze the current situation (e.g., weather or social media alerts) for a particular location (e.g., location of interest). Utilizing the weather analytics sub-component, the disaster recovery invocation program 110a, 110b may identify probable risks connected with upcoming weather incidents (e.g., hurricane or flood). By utilizing an external weather prediction system independent from the end user, the disaster recovery invocation program 110a, 110b may receive as input the upcoming weather incidents for a previously determined period of time (e.g., default is the next seven days or 168 hours) for the location of interest.

Utilizing the social media analytics sub-component, the disaster recovery invocation program 110a, 110b may collect any alerts or social behaviors (e.g., protests, manifestations) from the internet, including social media posts, breaking news associated with various sources, local and regional news sources, and blogs. The disaster recovery invocation program 110a, 110b may utilize an external search engine to search or crawl through the internet, including social networks and other sources, to identify any alerts or social behaviors that may invoke a disaster recovery within a previously determined period of time (e.g., default is the next seven days or 168 hours) for the location of interest. The search engine may then transmit the received data associated with alerts or social behaviors in any social network to the disaster recovery invocation program 110a, 110b via the communications network 116.

In at least one embodiment, an administrator may reconfigure or modify the settings to change the previously determined period of time for the weather and social media analytics component. In some embodiments, the disaster recovery invocation program 110a, 110b may automatically modify the previously determined period of time based on the patterns of previously determined periods of time, or based on an upcoming weather incidents or social media posts predicted shortly after previously determined period of time. For example, if the previously determined period of time is three days or 72 hours and, based on social media posts, internet blogs and a weather forecasting program, Hurricane K is estimated to make landfall at the location of interest in 90 hours as a category four hurricane, then the disaster recovery invocation program 110a, 110b may automatically adjust the previously determined period of time to include the next 90 hours, instead of 72 hours.

Continuing the previous example, based on the search engine, social media sources are indicating that there are several power outages throughout Miami, Fla. due to extremely hot and humid weather that the area has been experiencing for the past five days. In addition, the weather alerts have indicated that the current temperature at the location of Data Center X is more than 97 degrees Fahrenheit with a humidity of 100%.

Then, at 216, the hidden trials analysis component is commenced. Utilizing the hidden trials analysis component, the disaster recovery invocation program 110a, 110b may search a past disaster recovery invocation database 218 (e.g., database 114) for connections or hidden patterns from the data associated with additional factors that may lead to the unavailability or unreachability of a site (i.e., location of interest), service and/or personnel. The past disaster recovery invocation database 218 (i.e., past DRI database or knowledge base) may include past experiences of disaster recovery invocation in which the disaster recovery was or was not invoked. For example, in Data Center N there was a reoccurring issue affecting a large customer, when incidents were logged for transaction processing servers, the transaction processing servers would stop unexpectedly. Due to a high level of importance for IT, the disaster recovery invocation would commence for several of the servers, since the servers were unreachable. The same issue occurred a couple of times. When an investigation was performed, the servers were discovered to have been corroded (i.e., rusty metal). Since the servers were quite new, corrosion was highly unexpected. After further investigation, a determination was made that the corrosion was caused by a change in the air composition provided by the air conditioner to the room where these servers resided. The new vendor provided different air filters that caused an accumulation of sulfur in the air which caused the damage in the servers. Such an incident may be included in the past DRI database 218 for the disaster recovery invocation program 110a, 110b to assess the risk of incident more accurately by discovering the hidden trial as a change of the sulfur level registered by the digital sensors in the area where servers reside.

Continuing the previous example, the disaster recovery invocation program 110a, 110b searches the past DRI database and discovers an incident in which poor air humidity, due to inoperable fans and cooling systems at the location of Server XYZ, was linked to the abrupt inoperability of Server XYZ in the past. There is no alert or information indicating that no one will be present at Data Center X, or that access to Data Center X may be limited or restricted.

Then, at 220, the predicted risk component is commenced. Utilizing the predicted risk component, the disaster recovery invocation program 110a, 110b may assess the risk of disaster recovery invocation as a function of the mined data (including weather analytics, social media alerts and data derived from the past DRI database (if any)) and estimated similarity value. The disaster recovery invocation program 110a, 110b may utilize the additional inputs function, $\text{AdIn\_i}(\ )$, for alert $(a\_i)$ to assess the risk. $\text{AdIn\_i}(\ )$ function is defined for each (i) respectively if one of the following situation takes place: (1) there is a high severity incident(s)/data center infrastructure failure connected to the considered incident, then (a) there is a security incident(s) or physical breach of a data center, (b) data center infrastructure protection level is defined and can be used, (c) business risk connected with importance of IT environment is defined and can be used, and/or (d) social media data, acts of war or terrorism, pandemic situations and weather and natural disaster data can be assessed based on alerts.

In at least one embodiment, the disaster recovery invocation program 110a, 110b may define a function, $\text{AdIn\_i}(a)$, assuming a is an existing alert for the location of interest, as a numeric value from a normalized range [0,1] depending on the significance of the alert. The function may be a higher value for more significant alerts.

The disaster recovery invocation program 110a, 110b may then define the risk adjustment function as follows:

$$Rdr(x) = 1 - \exp[-(SwcM(x) + Kwa(x) + \Sigma(\text{AdIn\_i}(a\_i)))^{2/2}]$$

This number represents the risk for an incident to cause a disaster recovery invocation, which is in the range [0,1] calculated based on the reverse normal distribution function. In at least one embodiment, the greater the values of $SwcM(x)$, $Kwa(x)$, $\text{AdIn\_i}(\ )$, then the closer the risk value is to 1. However, the lesser the values of $SwcM(x)$, $Kwa(x)$, $\text{AdIn\_i}(\ )$, then the closer the risk value is to 0.

The disaster recovery invocation program 110a, 110b may then utilize a defined risk threshold (t), which may be used as a filter for only incident risks that are considered high, or when the Rdr(x)>t, since the value t depends on the considered data center. The defined risk threshold may be previously provided by an end user, or administrator, to the disaster recovery invocation program 110a, 110b.

Continuing the previous example, the assessed risk for Server XYZ located at Data Center X is 0.75 out of 1.0. When compared to the defined risk threshold of 0.69, the assessed risk of Server XYZ is considered high, since 0.75 is greater than the defined risk threshold of 0.69. Therefore, disaster recovery is invoked on Server XYZ located at Data Center X in Miami, Fla.

In at least one embodiment, the disaster recovery invocation program 110a, 110b may include a predicted risk database and continual learning improvement component (e.g., database 114) in which the results of the calculations may be stored and may be later utilized to modify the tickets database 210 (e.g., Rdr(x)>t and business impact occurs).

The functionality of a computer may be improved by the disaster recovery invocation program 110a, 110b because the disaster recovery invocation program 110a, 110b may estimate the probability of disaster recovery invocation by corroborating historical classification of infrastructure incidents, high severity incidents/data center infrastructure failure, security incidents and physical breach of a data center, data center infrastructure protection level, business risk connected with importance of IT environment, social media data, acts of war or terrorism, pandemic situations, and weather and natural disaster data. The disaster recovery invocation program 110a, 110b may also stop (or abort) the disaster recovery invocation preparation or execution based on the proposed classification, and reduce a probability of missing the IT environment recovery Service Level Agreement by improving recovery time through the utilization of a simulation engine to proactively assess the invocation to be implemented based on confidence level. The disaster recovery invocation program 110a, 110b may further include a continual learning improvement component, which stores the results of the calculation, and may utilize the results of the calculation to modify the incident knowledge base, when specific business impact occurs.

The technical actions performed by the disaster recovery invocation program 110a, 110b may further improve the recovery time (through added and early awareness, expanded back-out plans and preparation actions), and may reduce the disaster recovery failure probability.

The disaster recovery invocation program 110a, 110b may further improve computer functionality by being independent from whether a real disaster occurs or not since the occurrence of a natural disaster may have minimal, if any, effect on the location of interest and therefore the IT environment may not need any disaster recovery invocation, or in the reverse way, disaster recovery invocation may be necessary even though there is no natural disaster. As such, the disaster recovery invocation program 110a, 110b may depend on the business risk connected with the importance of the IT environment, site protection level, client needs and additional factors which are uniquely assessed by the disaster recovery invocation program 110a, 110b. For example, a hurricane struck a data processing center (i.e., data center) location in the US. The center is flooded. However, due to some additional factors like site protection mechanisms, the disaster recovery invocation was not needed.

Additionally, in the present embodiment, the disaster recovery invocation program 110a, 110b may include additional factors that are not generated due to a natural disaster. These additional factors may include device unavailable incident tickets from a server or network that cannot be recovered in a short time interval, security breaches that may impact critical business components in the data center, or terrorist threats (e.g., bomb threats). The disaster recovery invocation program 110a, 110b may utilize these factors to determine if the protocol associated with the disaster recovery should be invoked.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
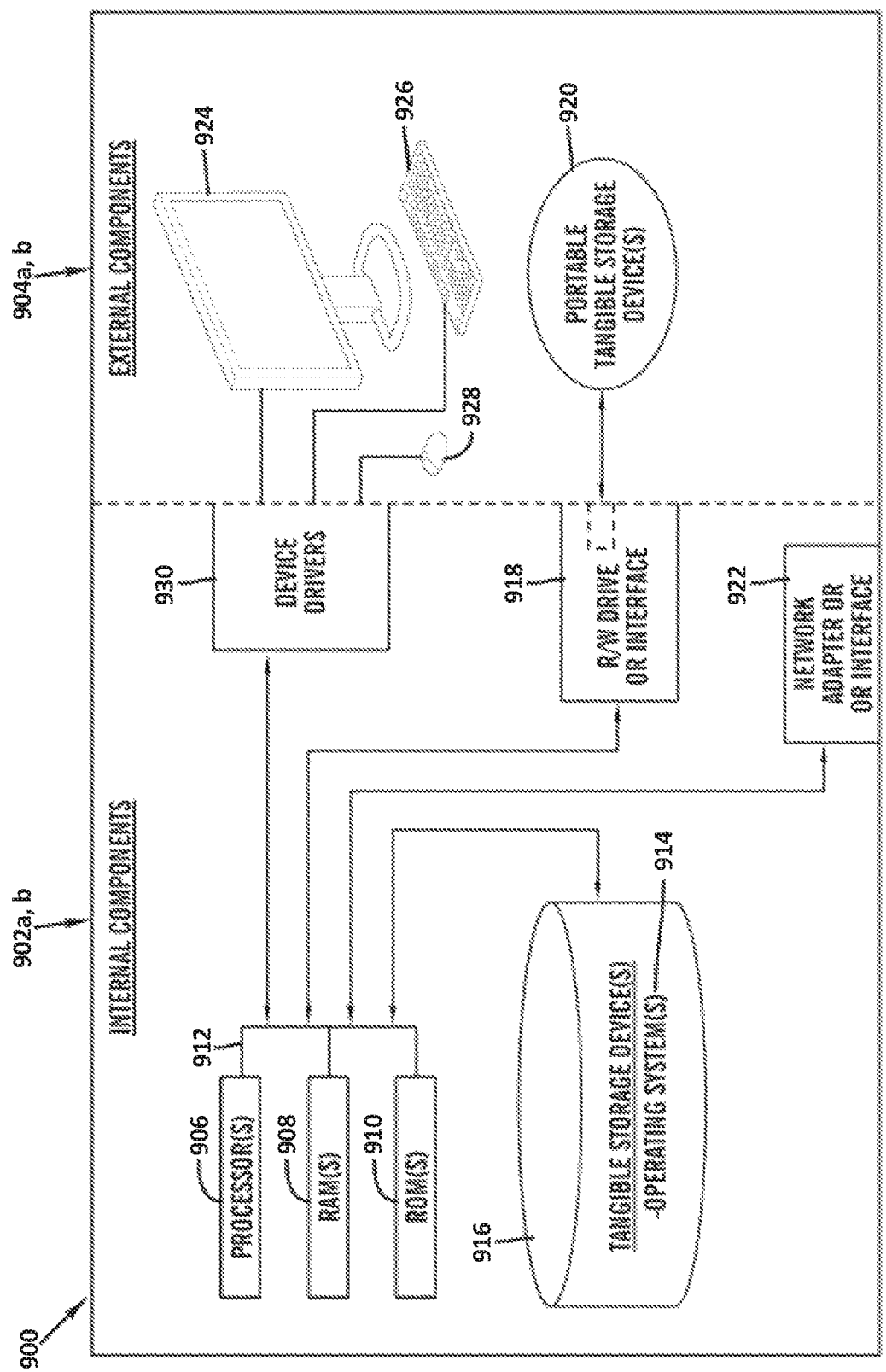
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the disaster recovery invocation program 110a in client computer 102, and the disaster recovery invocation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the disaster recovery invocation program 110a, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless Wi-Fi interface cards, or 3G or 4G wireless interface cards or other wired or wireless communication links. The software program 108 and the disaster recovery invocation program 110*a* in client computer 102 and the disaster recovery invocation program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the disaster recovery invocation program 110*a* in client computer 102 and the disaster recovery invocation program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
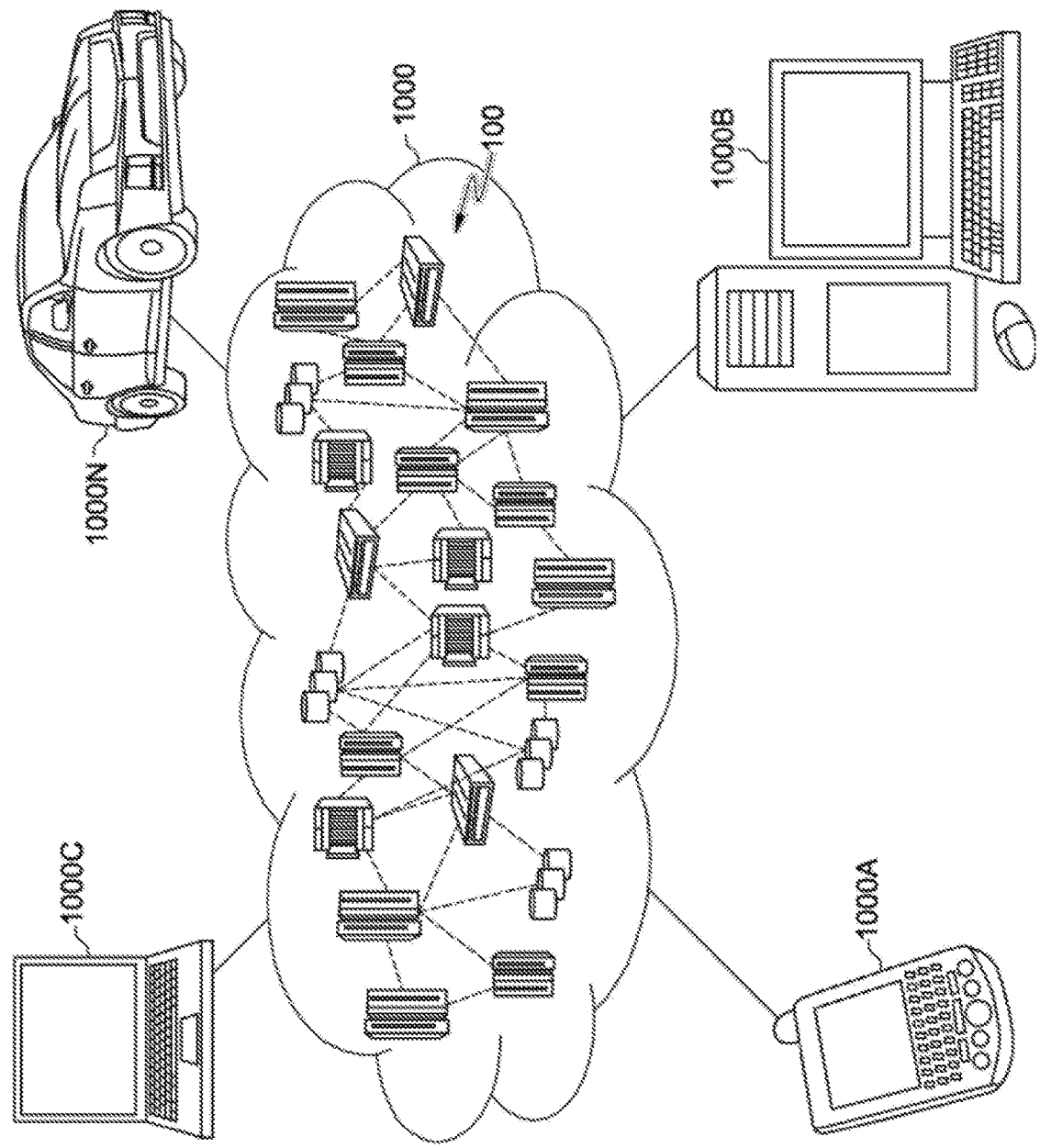
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and disaster recovery invocation 1156. A disaster recovery invocation program 110a, 110b provides a way to reduce the response time associated with disaster recovery invocation by corroborating historical classification, weather prediction and social media scanning analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving electronic data associated with a data center incident at a location;
    obtaining, via the received electronic data, an incident description, the obtaining comprising:
        determining whether the electronic data comprises unstructured data, and based on determining that the electronic data comprises unstructured data, electronically parsing the unstructured data to extract the incident description;
    retrieving, from an incident ticket database, past data collected in association with a plurality of prior data center incidents, the plurality of prior data center incidents comprising a plurality of actual data center incidents;
    comparing the data center incident to the plurality of prior data center incidents, the comparing including comparing the incident description associated with the data center incident to a prior incident description associated with an actual prior data center incident of the plurality of prior data center incidents, and wherein the comparing utilizes a counter function and a text-cleaning function which are applied to the incident description associated with the data center incident and applied to the prior incident description associated with the prior data center incident;
    estimating, based on the comparing, a similarity value associated with the data center incident relative to each of one or more data center incidents of the plurality of prior data center incidents of the incident ticket database, the estimating comprising:
        generating one or more similarity values representative of similarity of the received data center incident to each of the one or more prior data center incidents of the plurality of prior data center incidents;
classifying, based on the one or more similarity values and one or more classifications of the one or more prior data center incidents, the received data center incident into a category of multiple categories;
receiving a plurality of mined electronic data based on the location;
predicting an incident risk to the location based on the received plurality of mined electronic data, the category of the received data center incident, and the one or more similarity values, wherein predicting the incident risk to the location further comprises:
computing the incident risk to the location based on a distribution function; and
filtering the computed incident risk by utilizing a defined risk threshold,
wherein the computed incident risk considered to be low is eliminated; and
initiating an action based on the predicted incident risk to facilitate disaster recovery from the data center incident at the location.

2. The method of claim 1, wherein the plurality of mined data includes: one or more upcoming weather incidents, one or more alerts from a plurality of social media sources, a historical classification of the plurality of prior data center incidents, at least one data center infrastructure protection level, one or more business risks connected with the significance of an information technology (IT) environment, a plurality of high severity incidents associated with data center infrastructure failure, a plurality of security incidents associated with one or more physical breaches to a data center, and one or more past experiences of disaster recovery invocation.

3. The method of claim 1, wherein the electronic data associated with the data center incident at the location includes: an incident ticket, an infrastructure ticket, an infrastructure failure, a security incident, a weather alert, and a social media warning.

4. The method of claim 1, wherein the obtaining comprises:
identifying a plurality of relevant information from the received electronic data associated with the data center incident by utilizing a predictive engine,
wherein the identified plurality of relevant information includes an incident date, date of reporting, at least one reporting data center associated with the location, an incident summary, an incident description, and a plurality of optionally relevant information,
wherein the plurality of optionally relevant information includes a call code, a hostname, a region name, and a site name; and
synthesizing a set of plain text associated with the identified plurality of relevant information.

5. The method of claim 4, further comprising:
analyzing each past incident description from the plurality of past data center incidents with the incident description by utilizing natural language processing techniques,
wherein one or more terms are identified in the analyzed past incident descriptions and the analyzed incident description; and
applying the similarity value to the data center incident and each past data center incident from the plurality of past data center incidents based on the presence of the one or more identified terms,
wherein a weight is applied to each identified term of the one or more identified terms,
wherein the applied weight is based on the significance of the identified one or more terms to determining the predicted incident risk,
wherein the applied similarity value includes the applied weight for each of the identified one or more terms present in the compared data center incident and compared each plurality of past data center incidents.

6. The method of claim 5, further comprising:
ranking the applied similarity values for each past data center incident to the data center incident; and
generating a list of ranked similarity values for each past data center incident to the data center incident.

7. The method of claim 4, wherein synthesizing the set of plain text associated with the identified plurality of optionally relevant information, further comprises:
dividing the set of plain text by utilizing one or more spaces; and
performing a text cleaning,
wherein the text cleaning includes the removal of one or more stop words, one or more host names based on the configuration management database information, one or more words with three or more consecutive vowels, and one or more numbers from the divided set of plain text.

8. A computer system for estimating the probability of invoking information technology (IT) disaster recovery at a location based on an incident risk, comprising:
one or more processors, one or more computer-readable memories, one or more computer-readable tangible storage medium, and program instructions stored on at least one of the one or more tangible storage medium for execution by at least one of the one or more processors via at least one of the one or more memories further comprise program instructions to cause the computer system to perform a method comprising:
receiving electronic data associated with a data center incident at a location;
obtaining, via the received electronic data, an incident description, the obtaining comprising:
determining whether the electronic data comprises unstructured data, and based on determining that the electronic data comprises unstructured data, electronically parsing the unstructured data to extract the incident description;
retrieving, from an incident ticket database, past data collected in association with a plurality of prior data center incidents, the plurality of prior data center incidents comprising a plurality of actual data center incidents;
comparing the data center incident to the plurality of prior data center incidents, the comparing including comparing the incident description associated with the data center incident to a prior incident description associated with an actual prior data center incident of the plurality of prior data center incidents, and wherein the comparing utilizes a counter function and a text-cleaning function which are applied to the incident description associated with the data center incident and applied to the prior incident description associated with the prior data center incident;
estimating, based on the comparing, a similarity value associated with the data center incident relative to each of one or more data center incidents of the plurality of prior data center incidents of the incident ticket database, the estimating comprising:

generating one or more similarity values representative of similarity of the received data center incident to each of the one or more prior data center incidents of the plurality of prior data center incidents;

classifying, based on the one or more similarity values and one or more classifications of the one or more prior data center incidents, the received data center incident into a category of multiple categories;

receiving a plurality of mined electronic data based on the location;

predicting an incident risk to the location based on the received plurality of mined electronic data, the category of the received data center incident, and the one or more similarity values, wherein predicting the incident risk to the location further comprises:

computing the incident risk to the location based on a distribution function; and filtering the computed incident risk by utilizing a defined risk threshold, wherein the computed incident risk considered to be low is eliminated; and initiating an action based on the predicted incident risk to facilitate disaster recovery from the data center incident at the location.

9. The computer system of claim 8, wherein the plurality of mined data includes: one or more upcoming weather incidents, one or more alerts from a plurality of social media sources, a historical classification of the plurality of past incidents, at least one data center infrastructure protection level, one or more business risks connected with the significance of an IT environment, a plurality of high severity incidents associated with data center infrastructure failure, a plurality of security incidents associated with one or more physical breaches to a data center, and one or more past experiences of disaster recovery invocation.

10. The computer system of claim 8, wherein the electronic data associated with the data center incident at the location includes: an incident ticket, an infrastructure ticket, an infrastructure failure, a security incident, a weather alert, and a social media warning.

11. The computer system of claim 8, wherein the obtaining comprises:

identifying a plurality of relevant information from the received electronic data associated with the data center incident by utilizing a predictive engine, wherein the identified plurality of relevant information includes an incident date, date of reporting, at least one reporting data center associated with the location, an incident summary, an incident description, and a plurality of optionally relevant information, wherein the plurality of optionally relevant information includes a call code, a hostname, a region name, and a site name; and synthesizing a set of plain text associated with the identified plurality of relevant information.

12. The computer system of claim 11, further comprising:
analyzing each past incident description from the plurality of past data center incidents with the incident description by utilizing natural language processing techniques, wherein one or more terms are identified in the analyzed past incident descriptions and the analyzed incident description; and applying the similarity value to the data center incident and each past data center incident from the plurality of past data center incidents based on the presence of the one or more identified terms, wherein a weight is applied to each identified term of the one or more identified terms, wherein the applied weight is based on the significance of the identified one or more terms to determining the predicted incident risk, wherein the applied similarity value includes the applied weight for each of the identified one or more terms present in the compared data center incident and compared each plurality of past data center incidents.

13. The computer system of claim 12, further comprising:
ranking the applied similarity values for each past data center incident to the data center incident; and generating a list of ranked similarity values for each past incident data center to the data center incident.

14. The computer system of claim 11, wherein synthesizing the set of plain text associated with the identified plurality of optionally relevant information, further comprises:

dividing the set of plain text by utilizing one or more spaces; and performing a text cleaning, wherein the text cleaning includes the removal of one or more stop words, one or more host names based on the configuration management database information, one or more words with three or more consecutive vowels, and one or more numbers from the divided set of plain text.

15. A computer program product for estimating the probability of invoking information technology (IT) disaster recovery at a location based on an incident risk, the computer program product comprising a computer readable storage medium having program instructions embodied therewith, the program instructions executable by processor to cause the computer to perform the method comprising:

receiving electronic data associated with a data center incident at a location;

obtaining, via the received electronic data, an incident description, the obtaining comprising:

determining whether the electronic data comprises unstructured data, and based on determining that the electronic data comprises unstructured data, electronically parsing the unstructured data to extract the incident description;

retrieving, from an incident ticket database, past data collected in association with a plurality of prior data center incidents, the plurality of prior data center incidents comprising a plurality of actual data center incidents;

comparing the data center incident to the plurality of prior data center incidents, the comparing including comparing the incident description associated with the data center incident to a prior incident description associated with an actual prior data center incident of the plurality of prior data center incidents, and wherein the comparing utilizes a counter function and a text-cleaning function which are applied to the incident description associated with the data center incident and applied to the prior incident description associated with the prior data center incident;

estimating, based on the comparing, a similarity value associated with the data center incident relative to each of one or more data center incidents of the plurality of prior data center incidents of the incident ticket database, the estimating comprising:

generating one or more similarity values representative of similarity of the received data center incident to each of the one or more prior data center incidents of the plurality of prior data center incidents;

classifying, based on the one or more similarity values and one or more classifications of the one or more prior data center incidents, the received data center incident into a category of multiple categories;

receiving a plurality of mined electronic data based on the location;

predicting an incident risk to the location based on the received plurality of mined electronic data, the category of the received data center incident, and the one or more similarity values, wherein predicting the incident risk to the location further comprises:

computing the incident risk to the location based on a distribution function; and filtering the computed incident risk by utilizing a defined risk threshold, wherein the computed incident risk considered to be low is eliminated; and initiating an action based on the predicted incident risk to facilitate disaster recovery from the data center incident at the location.

16. The computer program product of claim 15, wherein the plurality of mined data includes: one or more upcoming weather incidents, one or more alerts from a plurality of social media sources, a historical classification of the plurality of past incidents, at least one data center infrastructure protection level, one or more business risks connected with the significance of an IT environment, a plurality of high severity incidents associated with data center infrastructure failure, a plurality of security incidents associated with one or more physical breaches to a data center, and one or more past experiences of disaster recovery invocation.

17. The computer program product of claim 15, wherein the electronic data associated with the data center incident at the location includes: an incident ticket, an infrastructure ticket, an infrastructure failure, a security incident, a weather alert, and a social media warning.

18. The computer program product of claim 15, wherein the obtaining comprises:

identifying a plurality of relevant information from the received electronic data associated with the data center incident by utilizing a predictive engine, wherein the identified plurality of relevant information includes an incident date, date of reporting, at least one reporting data center associated with the location, an incident summary, an incident description, and a plurality of optionally relevant information, wherein the plurality of optionally relevant information includes a call code, a hostname, a region name, and a site name; and synthesizing a set of plain text associated with the identified plurality of relevant information.

* * * * *